Feb. 24, 1953     S. W. SMALE     2,629,495
MAGNETIC SWEEPER
Filed Jan. 10, 1950     2 SHEETS—SHEET 2
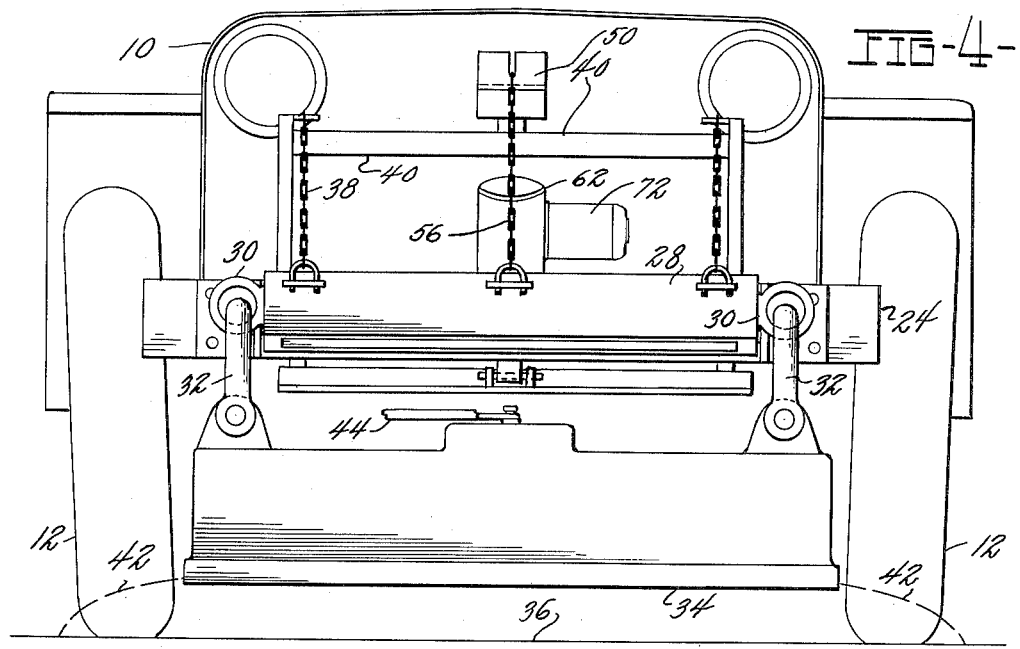
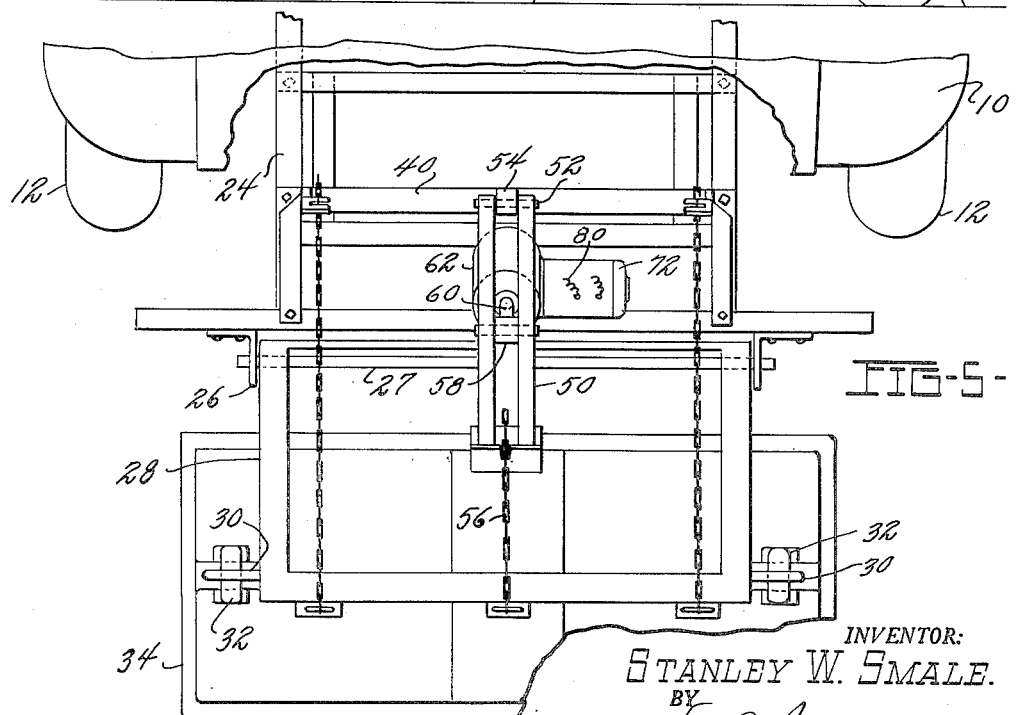
INVENTOR:
STANLEY W. SMALE.
BY
ATTY.

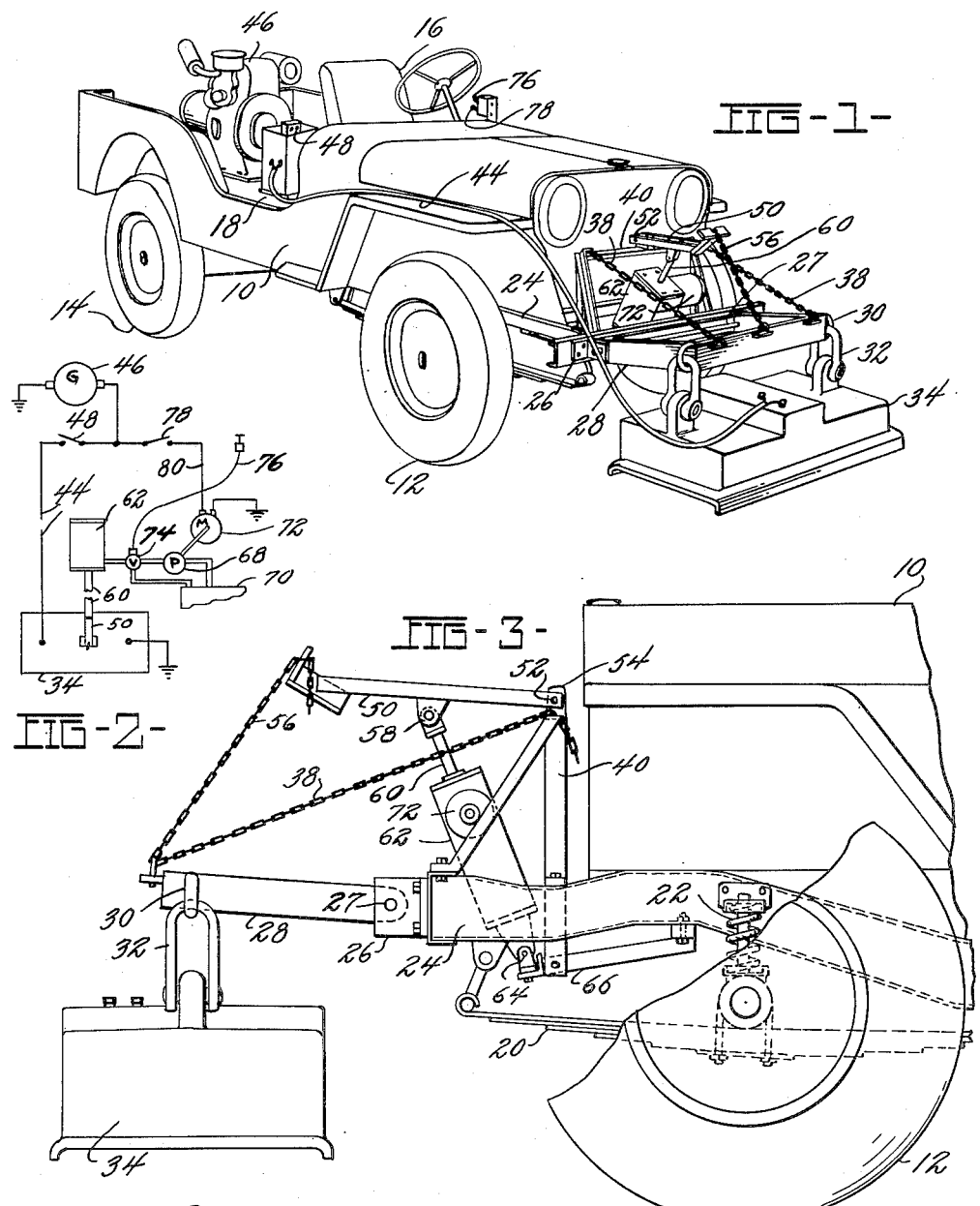

Patented Feb. 24, 1953

2,629,495

UNITED STATES PATENT OFFICE 2,629,495

MAGNETIC SWEEPER

Stanley W. Smale, Toledo, Ohio

Application January 10, 1950, Serial No. 137,697

1 Claim. (Cl. 209—223)

This invention relates to magnetic sweepers.

An object of this invention is to provide an apparatus of such size and mobility that it can be used to remove ferrous articles from roads, parking lots or any surface over which vehicles may travel, in an effective, speedy and economical manner.

Another object of this invention is to provide a mobile magnetic field of sufficient force to not only pick up loose items, but pieces embedded below the surface which might normally be forced upwardly through the surface by frost or other disturbing influences.

Another object of this invention is to provide a mobile unit carried on pneumatic tires, having the magnetic field normally precede the vehicle and being of such lateral extent as to protect the tires of the unit through removal of hazards from the path of the tires.

Another object of this invention is to provide a vehicle wherein the weights of the parts are so distributed on and about the vehicle that there is no handicap imposed on the usual flexibility of the vehicle's movements.

Another object of this invention is to provide a flexible mount for the magnet incorporating a power unit operable for ready manipulation of the mount.

And another object of this invention is to provide a unit which may be completely controlled from one station, as for example, drive of the truck, elevation control of the magnet, control of the magnitizing apparatus, and control of the circuit therefrom to the magnet.

Other objects and advantages of this invention relating to the arrangement, operation and function of the related elements of the structure, to various details of construction, to combinations of parts and to economies of manufacture, will be apparent to those skilled in the art upon consideration of the following description and appended claim, reference being had to the accompanying drawings forming a part of this specification wherein like reference characters designate corresponding parts in the several views.

Referring to the drawings:

Fig. 1 is a perspective view of the apparatus;

Fig. 2 is a diagram of the power circuits incorporated within the device;

Fig. 3 is a side elevation of a forward portion of the truck, showing the magnet in operating position;

Fig. 4 is a front elevation of the device; and

Fig. 5 is a plan view of the showing in Fig. 3.

While the invention is susceptible of being incorporated with most types of commercial trucks, the so-called "jeep" is particularly adapted to accept ready installation. To this end, a truck 10, which is mounted on front wheels 12, rear wheels 14, and provided with a driver's station 16 therebetween, presents a desirable arrangement including a deck 18 in the rear. The front wheels 12 are mounted by the normal spring constructions 20 and are augmented by springs 22. These springs 22 are disposed between the wheels 12 and truck chassis 24 and in trucks of the type herein described approximate a center for overall truck balance when equipped with the magnetic pick-up mechanism included in the invention.

A pair of brackets 26 are fixed to the forward cross-piece of the chassis 24, providing bearings for axle 27, in turn pivotally mounting a rectangular frame 28. This frame 28 serves as a boom to carry hooks or eyes 30, mounting links 32, supporting a magnetic pick-up element 34. The pick-up 34 suspended from the frame 28, is raised and lowered to and from the surface 36, which supports the truck, by a swinging or rocking movement of the frame on its mount 27.

The desired operating spacing of the magnet above the surface 36 to be cleaned is fixed by chains 38 attached at one end to the outer edge of the frame 28 and having their opposite ends adjustably attached to a second or fixed frame 40 mounted on the chassis 24.

The magnet 34 is designed to provide a magnetic path 42 not only entirely across the front of the truck but somewhat beyond the outer sides of the tires on the front wheels 12 so that these tires are protected. The useful magnetic field is also of a potential to pick up the loose ferrous objects in the path covered and also such objects as might be embedded in and below the surface 36 so as to be projected through the surface by frost action or other disturbances.

Power to the magnet is supplied through a circuit 44 from a magnetizing apparatus 46 mounted on the deck 18. This apparatus is herein shown as a motor driven generator of sufficient kv. capacity to supply the necessary current for the magnet to be operated as described. A switch 48 in the circuit 44 is disposed adjacent the driver's station 16.

By mounting the power plant on the deck 18, which is at the rear of the truck behind the wheels 12, it balances the overall structure against the weight of the magnet suspended ahead of the wheels 12, so that the wheels 12 serve as a fulcrum for the load and hence the springs 22 aid in not only carrying this load but provide a spring center of balance.

The elevator mechanism for the frame 28 is herein shown as including an arm or lever 50 pivotally mounted at one end on fulcrum 52 carried by bearing 54 on the frame 40 and having adjustable length chain connection 56 between the outer end of this arm 50 and the outer edge of the frame 28.

The arm 50 carries intermediate bearing 58 to which is pivotally attached piston rod 60 of hydraulic jack 62 having pivotal mount 64 with frame extension 66 of the frame 40. By this arrangement, an expansion of the jack will raise the arm 50 to lift the magnet 34 and a retraction of the jack device lowers the magnet. These movements are effected by pump 68 as part of the unit for supplying fluid to the jack from a suitably positioned sump 70 as driven by motor 72. The flow of the fluid is controlled by valve 74 to or from the jack, which valve 74, in turn, is operated by an extension 76 to a convenient position adjacent the driver's station 16 and also adjacent a switch 78 in an electric circuit 80 for controlling the motor 72.

For convenience, the hydraulic jack 62 may incorporate the operating motor 72, sump 70 and piston structure with the rod 60 all in a housed unit to be mounted forwardly of the truck on the frame 40 and its reinforcing extension 66.

The device is operated by a single individual as all the controls are at the driver's station and the arrangement of the magnet permits it to be maneuvered into small areas, in, around and under other trucks, loading platforms, construction work and the like.

The utility of the apparatus is further increased by the boom construction, which allows for the mounting of other tools thereon, such as snow plows, scrapers and the like and lending a measure of desired operation function thereto.

It is to be understood that the above detailed description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it is not intended to limit the scope of the following claim beyond the requirements of the prior art.

What is claimed and is desired to secure by United States Letters Patent:

A magnetic sweeper embodying a truck incorporating a chassis including a pair of side members, said truck having a driver's station, wheels supporting the front of said truck between the driver's station and the forward termini of said side members, said chassis including a cross-beam connecting the forward termini of said members, a rectangular frame including a pair of opposing major sides and a pair of opposing minor sides, one of said major sides hingedly attached to said cross-beam, said rectangular frame adapted to provide an extension of said chassis forwardly from the wheels, an elongated magnet having its opposite ends suspended by linkage from the minor sides of said rectangular frame to provide a continuous magnetic field at least entirely across the distance between the outer sides of said wheels and forwardly thereof, a second frame upstanding from said chassis secured to the cross-beam, a flexible connection between the second frame and a forward portion of said rectangular frame providing a limit for the downward swing of said rectangular frame on its hinged mounting and also serve as support for the frame holding the magnet in operative position, hydraulic means for raising and lowering said rectangular frame, a deck on said truck rearwardly of the wheels, magnetic apparatus carried on the deck, a circuit between said magnetizing means and said magnet, and means at said driver's station for controlling said circuit and the hydraulic means for raising and lowering said rectangular frame.

STANLEY W. SMALE.

REFERENCES CITED

The following references are of record in the file of this patent:

UNITED STATES PATENTS

| Number | Name | Date |
|---|---|---|
| 931,885 | Powell | Aug. 24, 1909 |
| 1,326,559 | Ody | Dec. 30, 1919 |
| 1,630,987 | Turner | May 31, 1927 |
| 1,759,687 | Carter | May 20, 1930 |
| 1,763,457 | Churchill | June 10, 1930 |
| 1,961,336 | Close | June 5, 1934 |
| 2,091,343 | Soule | Aug. 31, 1937 |
| 2,147,207 | Nikkel | Feb. 14, 1939 |
| 2,426,795 | Sjostrom | Sept. 2, 1947 |
| 2,450,905 | Mork | Oct. 12, 1948 |